J. PARKER.
RAISING AND LOWERING DEVICE FOR AGRICULTURAL IMPLEMENTS.
APPLICATION FILED MAY 1, 1916.

1,217,995.

Patented Mar. 6, 1917.

Witnesses

J. Parker
Inventor
by
Attorneys

UNITED STATES PATENT OFFICE.

JIM PARKER, OF TECUMSEH, OKLAHOMA.

RAISING AND LOWERING DEVICE FOR AGRICULTURAL IMPLEMENTS.

1,217,995.

Specification of Letters Patent.

Patented Mar. 6, 1917.

Original application filed October 27, 1914, Serial No. 868,868. Divided and this application filed May 1, 1916. Serial No. 94,764.

*To all whom it may concern:*

Be it known that I, JIM PARKER, a citizen of the United States, residing at Tecumseh, in the county of Pottawatomie and State of Oklahoma, have invented a new and useful Raising and Lowering Device for Agricultural Implements, of which the following is a specification.

The present invention appertains to agricultural implements, and this is a divisional application of the application for patent on a tree digger, Serial No. 868,868, filed October 27, 1914, now Patent No. 1,182,032, granted May 9, 1916.

It is the specific object of the invention to provide novel and improved means for depressing and elevating the soil engaging blade of the machine, which in the present case is illustrated as a tree digger, although it is to be understood that the raising and lowering device can be used upon various agricultural implements.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
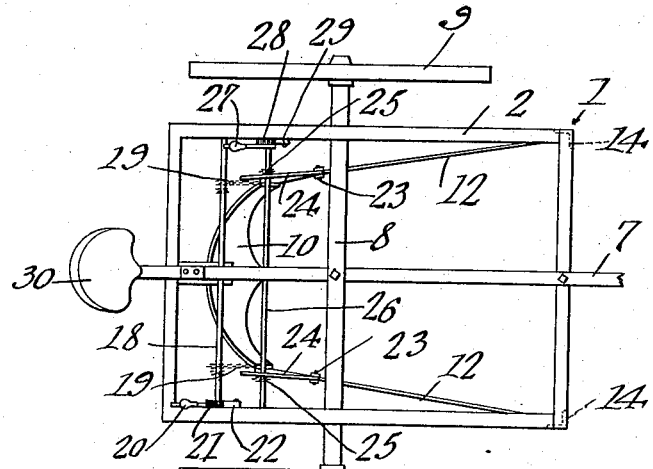
Figure 1 is a plan view of the tree digger, portions being broken away.

In carrying out the invention, there is provided a sulky or wheel mounted frame or body 1, which includes the upper rectangular section 2 and the side sections 3 attached thereto, and including the front and rear upright portions 4 and 5, respectively, and the longitudinal bars or members 6 connecting the lower ends of the portions 4 and 5. The frame 1 is thus of inverted U-shape or is arched transversely.

A longitudinal tongue or pole 7 is bolted or otherwise secured upon the ends of the top section 2 of the frame 1 intermediate the side sections 3 of the frame and an arched axle 8 has its upright portions secured within the side sections 3 of the frame 1, while the intermediate or crest portion of the axle 8 projects upwardly through the top section 2 and passes over the tongue or pole 7. The intermediate or crest portion of the axle 8 is secured upon the tongue or pole 7, while the spindles of the axle project outwardly below the lower bars or members 6 of the side sections 3, and have the ground wheels 9 journaled thereon at the sides of the frame 1. The axle 8 is disposed intermediate the ends of the frame 1 to balance the machine.

Figure 2:
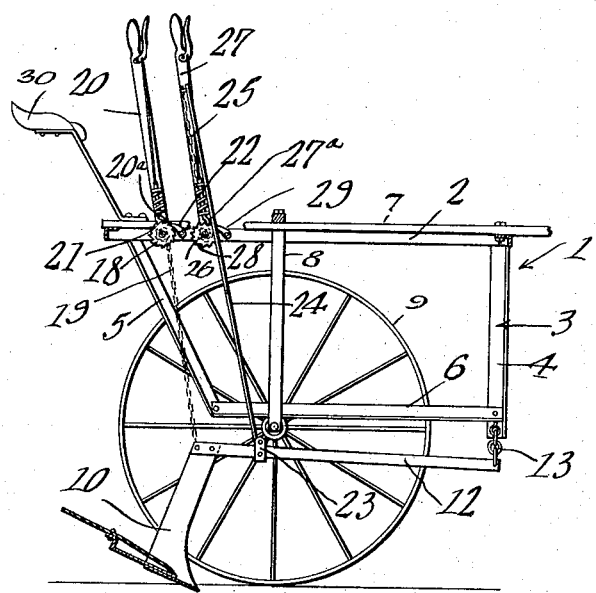
Fig. 2 is a longitudinal section thereof, portions being broken away.

The shovel or digging blade 10 is of U-shape, and is carried by a pair of forwardly projecting and diverging beams 12 which have their rear ends securely riveted or otherwise attached to the upper ends of the shovel 10, while the forward ends of the beams 12 are loosely connected to the lower protruding ends of the standards or uprights 4 of the frame 1, by means of short chains or links 13. The beams 12 are arranged at obtuse angles with the shovel 10, as clearly seen in Fig. 2, whereby the intermediate or lower portion of the shovel will be arranged at an acute angle with respect to the beams 12. The beams 12 lie below the frame 1 and the axle 8, whereby the shovel will be carried below the rear portion of the frame, the beams 12 and the shovel 10 trailing from the forward end portion of the frame, as will be apparent.

As a means for elevating the shovel 10, and for limiting the downward movement thereof, there is provided a transverse shaft 18 terminally journaled to the sides of the top section 2 of the frame adjacent the rear end of the frame, and the chains or other flexible elements 19 are attached to the points of juncture of the beams 12 and the shovel 10 and are secured to the shaft 18 to be wound thereon. A suitable hand lever 20 is fulcrumed loosely upon the shaft 18 adjacent the right hand side of the frame 1, and carries a lower spring pressed pawl or dog 20$^a$ engageable with a ratchet wheel 21 keyed or otherwise secured upon the shaft 18, and a pawl or dog 22 is carried by the right hand side of the frame to engage the ratchet wheel 21 for normally preventing the retrograde or reverse rotation of the said shaft.

The mechanism for depressing the shovel 10 and maintaining the same in depressed position, embodies a pair of U-shaped clips 23 straddling the beams 12 from below and adjustably secured to the said beams adjacent their rear ends or the shovel 10, and a pair of thrust rods 24 have their lower ends pivoted between the ends of the respective clips 23 and have chains or flexible elements 25 detachably connected to their upper ends. The lower ends of the chains 25 are secured to and adapted to be wound upon a transverse winding shaft 26 terminally journaled to the sides of the top sections 2 of the frame immediately in advance of the shaft 18. The thrust rods 24 project above and are adapted to rest rearwardly against the shaft 26, in order that when the chains 25 are wound upon the shaft 26, the thrust rods 24 will be forcibly depressed to swing the beams 12 downwardly. The shaft 26 may be conveniently rotated through the medium of a suitable hand lever 27 loosely fulcrumed upon the shaft 26 adjacent the left hand side of the frame 1, and carrying a spring pressed pawl or dog 27ª engageable with the ratchet wheel 28 secured upon the shaft 26. A pawl or dog 29 is carried by the left hand side of the frame 1 for engaging the ratchet wheel 28 to prevent the reverse rotation of the shaft 26 under normal conditions.

The operator's seat 30 is carried by the rear end of the frame 1 and lies between the right and left hand levers 20 and 27 which may be readily manipulated by the operator, and which afford considerable purchase in rotating the shafts 18 and 26, respectively.

The machine is adapted to be drawn over the ground by a plurality of horses, mules or other draft animals.

In operation, when the machine is being drawn over the soil with the frame 1 running astride a row of young trees, the shovel or digging blade 10 may be forcibly depressed into the soil to loosen the trees or plants and lift them up by their roots. To depress the shovel, the thrust rods 24 are pressed downwardly and the upper or free ends of the chains 25 are engaged to the upper ends of the rods 24, in which event the winding shaft 26 is rotated in the proper direction by oscillating the hand lever 26, so as to wind the chains 25 upon the shaft 26 to forcibly depress the beams 12 and to hold the said beams in a lowered position. The inclination of the intermediate portion of the shovel with respect to the beams 12, will give the shovel a natural tendency to work its way into the soil below the surface thereof, so that the shovel may be conveniently depressed, especially due to the fact that the hand lever 27 being operatively connected to the shaft 26 through the pawl and ratchet device, will afford a considerable purchase for depressing the beams 12.

The forward edge of the shovel 10 being sharpened, will enable the shovel to cut its way through the soil in a convenient and ready manner, under the plants or trees. The intermediate portion of the shovel will cut under the plants, while the sides or arms of the shovel will loosen or sever the soil at the sides of the row of plants being dug.

To raise the shovel out of the soil, as when the machine is running idle, or when the machine is turned around at the ends of the rows, the pawl or dog 29 which holds the shaft 26 against reverse rotation, is released from the ratchet wheel 28, and the hand lever 20 is then oscillated to wind the chains 19 upon the winding shaft 18, which will raise the rear ends of the beams 12 to elevate the shovel blade above the surface of the soil. The pawl or dog 22 engaging the ratchet wheel 21 of the shaft 18 will hold the shaft 18 against retrograde movement, to prevent the chains 19 from unwinding, until the pawl or dog 22 is released for enabling the shovel to be depressed by the actuating hand lever 27 as above intimated.

With the present apparatus, it is an easy matter for the operator to depress and elevate the shovel, as desired, and in this manner, the labor of digging the trees or other plants is reduced to a minimum. The other advantages and capabilities of the present device will be obvious to those skilled in the art, without further comment being necessary.

Having thus described the invention, what is claimed as new is:

1. In a device of the character described, a riding frame, a beam loosely connected thereto and having a blade, a winding member carried by the frame, a thrust rod connected to the beam, and a flexible element connecting the thrust rod and winding member.

2. In a device of the character described, a riding frame, a beam loosely connected thereto and carrying a blade, a winding member carried by the frame, a thrust rod connected to said frame and projecting above said winding member, a flexible element connecting the upper end of said rod and winding member, a second winding member carried by the frame, and a flexible element connecting said beam and second winding member.

3. In a device of the character described, a riding frame, a longitudinal beam having its forward end loosely connected to the frame and having a blade at its rear end, a transverse winding shaft carried by the frame, a thrust rod pivotally connected with the beam adjacent the rear end thereof and projecting upwardly above said shaft, a flexible element connecting the upper end of said rod and shaft to be wound upon said shaft, a hand lever pivotally mounted upon said shaft, a ratchet wheel secured to said shaft, a pawl carried by said lever engageable with said ratchet wheel, and a pawl carried by the frame engageable with said ratchet wheel.

4. In a device of the character described, a riding frame, a beam having its forward end loosely connected thereto and having a blade at its rear end, a pair of winding shafts carried by the frame transversely thereof, a thrust rod having its lower end pivotally connected with said beam adjacent the rear end thereof and projecting upwardly above one of said shafts, a flexible element connecting said shaft and upper end of said rod, a flexible element connecting the other shaft and beam adjacent the rear end thereof, a hand lever pivotally mounted upon each shaft, a ratchet wheel secured upon each shaft, a pawl carried by each hand lever and engageable with the respective ratchet wheel, and pawls carried by the frame and engageable with the ratchet wheels.

In testimony that I claim the foregoing as my own, I have hereto affixed my signature in the presence of two witnesses.

JIM PARKER.

Witnesses:
SAM W. BRADLEY,
ANNA LEWIS.